United States Patent [19]

Maguire

[11] 3,933,238

[45] Jan. 20, 1976

[54] SHIELD ASSEMBLY FOR FLEXIBLE BELT CARRIER MECHANISM

[75] Inventor: Richard J. Maguire, Kingston, Mass.

[73] Assignee: The Gillette Company, Boston, Mass.

[22] Filed: June 19, 1974

[21] Appl. No.: 480,862

[52] U.S. Cl. .................. 198/189; 74/229; 118/500; 198/181; 198/182; 269/254 CS
[51] Int. Cl.² ........................................ B65G 17/00
[58] Field of Search ....... 198/16 MS, 181, 189, 182, 198/195, 196, 197, 110, 1; 269/254 CS; 134/131; 118/500; 74/229

[56] References Cited
UNITED STATES PATENTS

| | | | |
|---|---|---|---|
| 2,836,283 | 5/1958 | Hörth | 198/182 X |
| 3,578,144 | 5/1971 | Punzak | 198/189 X |

*Primary Examiner*—Evon C. Blunk
*Assistant Examiner*—Douglas D. Watts
*Attorney, Agent, or Firm*—Richard A. Wise; Olstein J. Bratlie; Mandel E. Slater

[57] ABSTRACT

In an endless flexible belt carrier mechanism for transporting workpieces, shield assemblies are inserted in the spaces between individual work holders in order to protect the mechanism from damage caused by debris falling between work holders into the mechanism. The shield assembly includes a pair of shield members, each shield member snugly abutting the adjacent work holder and biased outwardly to maintain close contact with the work holder when the flexible belt passes around a circular path.

7 Claims, 8 Drawing Figures

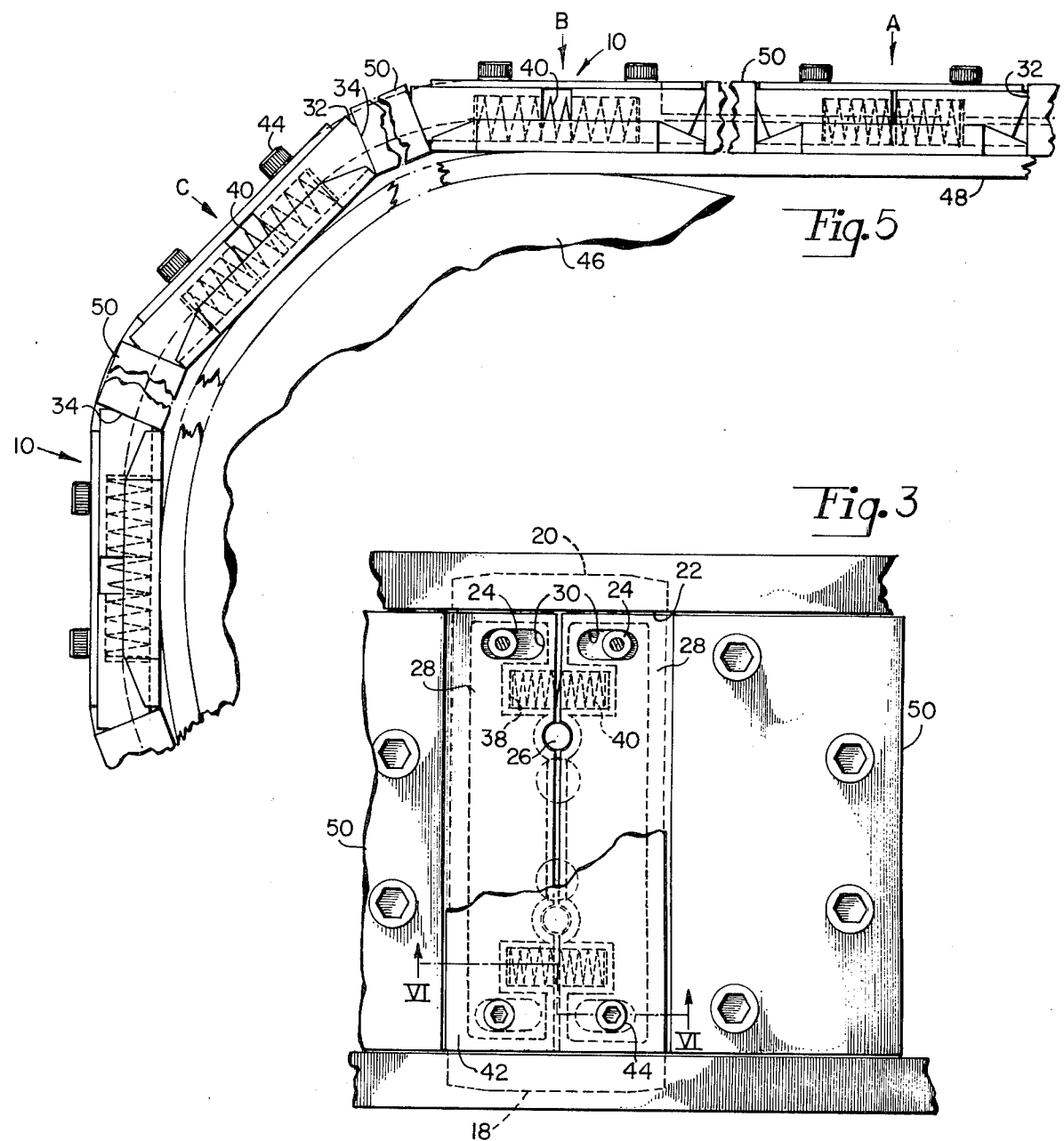

SHIELD ASSEMBLY FOR FLEXIBLE BELT CARRIER MECHANISM

BACKGROUND OF THE INVENTION

1. Field of the Invention

This invention relates to flexible belt carrier mechanisms, and is directed more particularly to shield assemblies for protecting such mechanisms from damage caused by debris that may fall between work holders carried by the belt.

2. Description of the Prior Art

Endless flexible belt carrier mechanisms supported on and moved by drums are well known for transporting workpieces and have found wide use in industry; an example of such a mechanism is described in U.S. Pat. No. 3,636,783. Such mechanisms typically have work holders spaced along and attached to the belt, which may be continuous or made up of a plurality of individual segments.

In some flexible belt carrier mechanisms that have found wide commercial application, the belt portion itself does not completely cover up and enclose the interior of the mechanism. It may be that the individual work holders, themselves, are of a size that could completely enclose the mechanism if the work holders would be in abutting relationship to each other. However, it is usually in the nature of the operations that are to be performed on the workpieces held or moved along by the work holders that the work holders need to be spaced apart from one another. As a result it may occur that debris from an operation on a workpiece, a dropped part of an apparatus, or other foreign matter will fall into the meachanism and possibly cause damage. One particularly serious form of damage can occur when the foreign matter gets caught between the belt and a drum, causing stretching and even breaking of the belt, resulting in loss of production and the expense of repair, which can involve an entire belt, even when the belt is in segmented form.

SUMMARY OF THE INVENTION

Accordingly it is the object of the present invention to provide a shield assembly for a flexible belt carrier mechanism which will prevent foreign matter from getting into the mechanism and causing damage.

With the above object in view, as will hereinafter appear, a feature of the present invention is the provision in a flexible belt carrier mechanism of the type above referred to of a shield assembly for insertion in the spaces between the work holders and adapted to move along with the belt, in order to fill the spaces between work holders and thereby protect the mechanism from foreign matter. Where the belt passes around a drum, the spaces between the work holders become larger, and in order to fill a larger space completely, the shield assembly is made expansible by the provision of a pair of outwardly biased shield members.

Where the belt is driven directly, the shield assemblies can idle, pushed along by the work carriers. It is also possible to operate the flexible belt carrier mechanism by driving the shield assemblies directly; this may be done by means of dowel pins on a drive drum extending outwardly from the surface of the drum through holes in the belt to engage holes in the bottom of the shield assemblies. In either case smooth operation of the apparatus is promoted by the provision of additional guide means for restraining the movement of the shield assembly to the path of the flexible belt; the guide means may take the form of projections extending from the shield assembly into guide channels disposed along the path of the flexible belt.

In a preferred embodiment the shield assemblies are provided with guide pins received in guide slots in the shield members for controlling the inward and outward movement of the shield members. A cover may also be provided to enclose all parts of the shield assembly and protect it, as well as the remainder of the flexible belt carrier mechanism, from foreign matter.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

FIG. 3 is a plan view, partially broken away, showing the shield assembly in compressed state between two work holders on a straight reach of a flexible belt carrier mechanism.

FIG. 4 is a partial view, similar to FIG. 3, showing the shield assembly in expanded state, as it passes around a drum.

FIG. 5 is a sectional view of a portion of a flexible belt carrier mechanism illustrating the action of several shield assemblies on a flexible belt passing around a drum.

DESCRIPTION OF A PREFERRED EMBODIMENT

Figure 1:
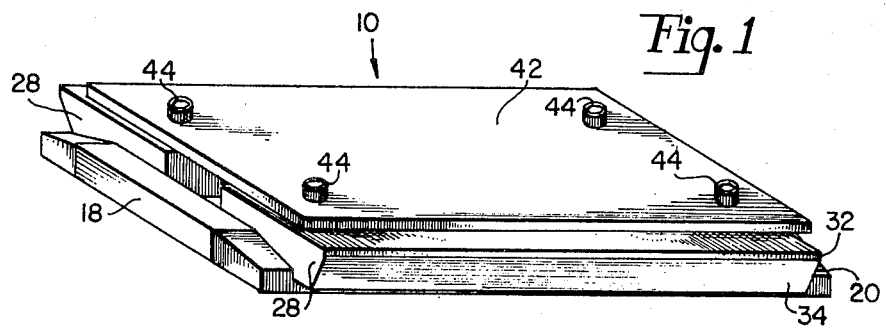
FIG. 1 is a perspective view of a shield assembly made according to the invention.
Figure 2:
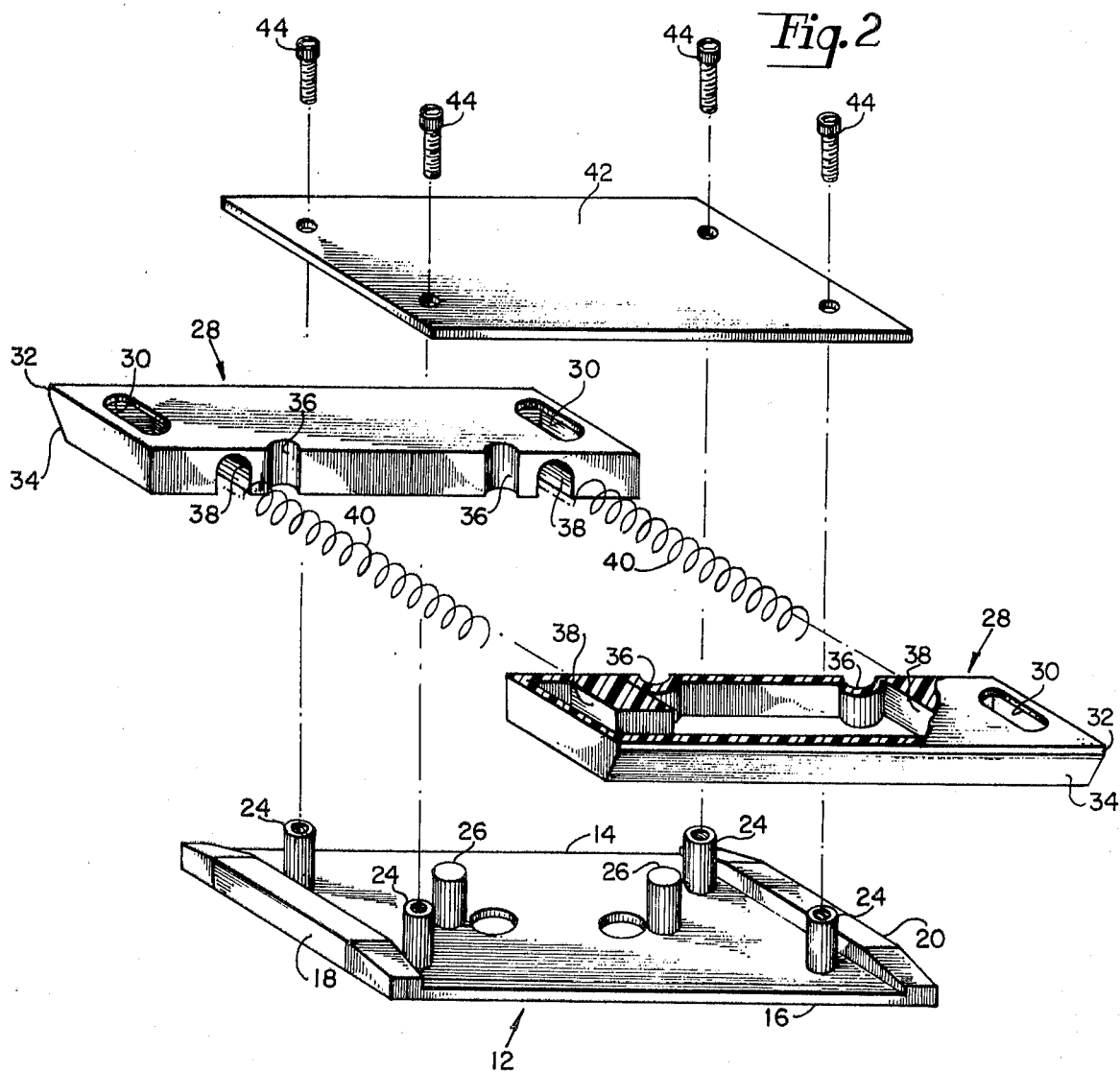
FIG. 2 is an exploded perspective view showing the parts of the shield assembly of FIG. 1, with one shield member partially broken away.

Referring to FIGS. 1 and 2, it will be seen that the illustrative shield assembly 10 includes a shoe 12 of generally rectangular shape having first and second parallel edges 14, 16 and side projections 18, 20 adapted to be received in guide channels 22 (FIGS. 3 and 4) for guiding movement of the shield assembly along the flexible belt carrier mechanism. The shoe is also provided with four guide pins 24, two of the guide pins 24 being disposed adjacent to each of the edges 14 and 16, and two stop posts 26 located along a line midway between edges 14 and 16.

Two identical shield members 28 of generally rectangular shape are slidably mounted on shoe 12 by means of guide slots 30 extending transversely of the shield members, each of the guide slots 30 receiving one of the guide pins 24. Each shield member 28 has an outward facing surface including a narrow vertical flat face 32 and a wide bevel 34 at an angle with respect to flat face 32. The inner facing surface of each shield member 28 is provided with two semi-circular recesses 36 in alignment with stop posts 26 and two spring cups 38 which receive one end of compression springs 40. A cover 42, enclosing the shield assembly and holding the parts together, is attached by means of screws 44 into guide pins 24, the guide pins extending slightly above shield members 28 so that cover 42 does not interfere with the sliding motion of shield members 28.

In the absence of any external restraint springs 40 urge shield members 28 outwardly until the inner ends of guide slots 30 stop against guide pins 24. When external means force shield members 28 inwardly, travel is limited by stop posts 26 or alternatively by the inner facing surfaces of the two shield members 28 coming together simultaneously just before either reaches the stop posts.

The use of the above-described shield assembly to maintain close sealing contact with individual work holders in a flexible belt carrier mechanism is shown in FIGS. 3-8. In FIG. 5 a rotating drum 46 supports and drives an endless flexible belt 48. Attached to and spaced apart along belt 48 are work holders 50. (The details of the work holders and their attachment to the belt are not shown, forming no part of the invention.) In typical modes of operation the work holders would have attachments adapted to move workpieces in progressive stages of assembly between stations at which various operations are carried out on the workpieces. Shield assemblies 10, dimensioned for the apparatus at hand, have been inserted in the spaces between the work holders 50.

Figure 6:
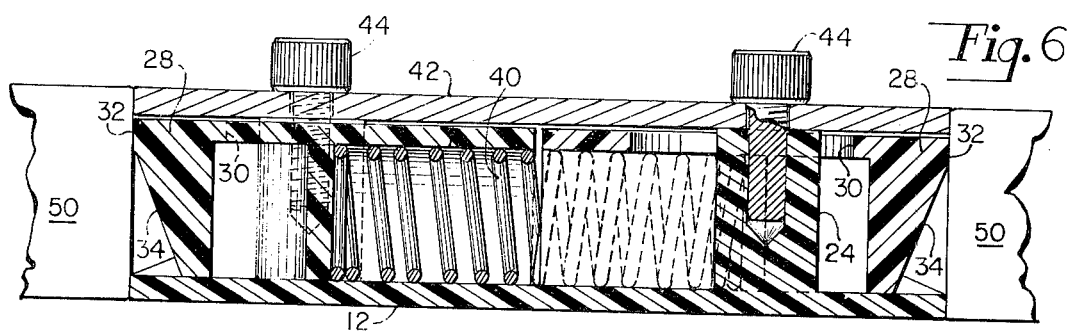
FIg. 6 is an enlarged sectional view of the shield assembly taken along line VI—VI of FIG. 3 and showing the parts of the shield assembly as a position A of FIG. 5.
Figure 7:
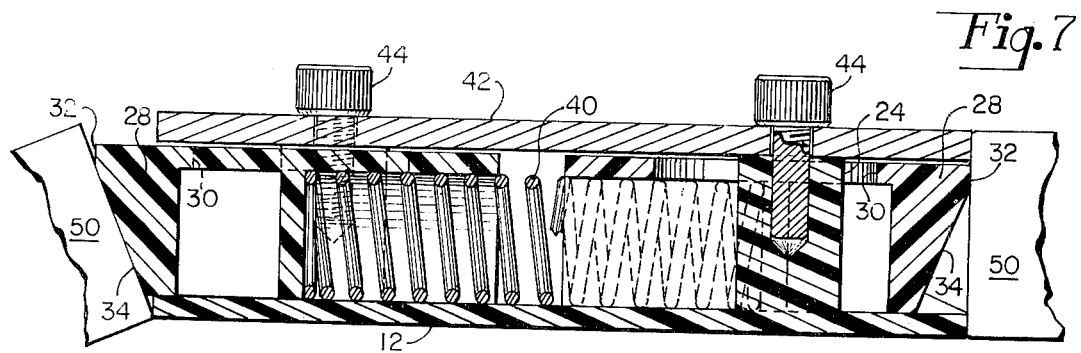
FIG. 7 is a view similar to FIG. 6, but showing the parts of the shield assembly as at position B of FIG. 5.
Figure 8:
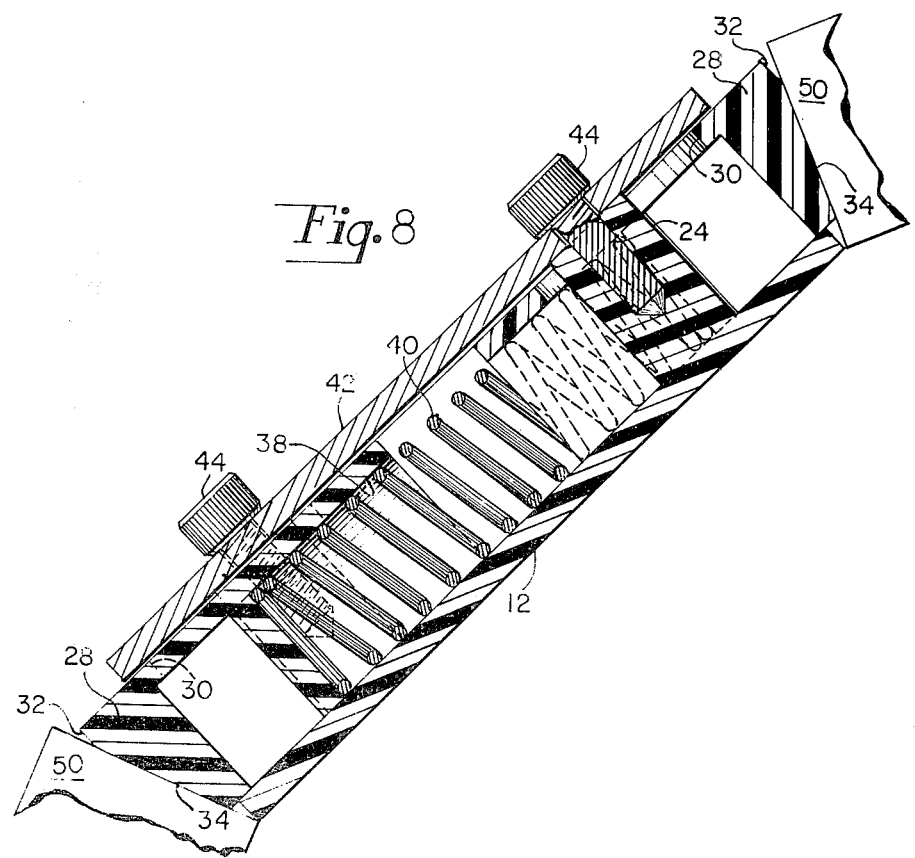
FIG. 8 is another view similar to FIG. 6, but showing the parts of the shield assembly as at position C of FIG. 5.

Along a straight reach of the belt, as shown at position A in FIG. 5, the shield members 28 have been compressed or forced inwardly to accommodate the distance between the work holders 50. The relative positions of the parts of shield assembly 10 in the compressed state are shown in FIGS. 3 and 6. At a transitional point, as shown at position B in FIG. 5, where a work holder has started around drum 46, one of the shield members 28 has extended, maintaining close contact with the adjacent work holder through the bevel 34. The relative positions of the parts at position B are shown in FIG. 7. When a shield assembly 10 is passing around drum 46, as shown at position C in FIG. 5, both shield members 28 are extended, with the configuration of parts as shown in FIGS. 4 and 8.

When a shield assembly 10 finishes passing around drum 46 to resume travel along a straight reach of the apparatus, shield members 28 again compress, first one and then the other. When there is substantial free play in the channels 22, as is frequently the case, the forces exerted on the shield assembly when the shield members are forced inwardly tend to urge the shield assembly underneath the adjacent work holder that is following, i.e. between that work holder and the belt. However this unwanted result is prevented by a countervailing force produced when the first shield member to compress backs up and pushes against the stop posts 26.

It is desirable to select the angle of bevel 34 with respect to flat face 32 so that where the shield assembly passes around the drum, contact between the bevel and the adjacent work holder is along essentially the entire surface of the bevel 34. To do this, the number of degrees of arc on the drum used by each combination of work holder and shield assembly is divided by two, the number of shield members per shield assembly. For example, if four shield assemblies are on the drum at one time, then each assembly accounts for 45° of the total 180° turn of the belt, and each bevel 34 should be at an angle of 22.5° with respect to flat face 32.

While the shield assembly of the invention has been shown as part of a flexible belt carrier mechanism that is essentially an endless loop, it is to be noted that by constructing the shield assembly with guide slots 30 oversize with respect to guide pins 24 and the space between side projections 18, 20 somewhat oversize with respect to the length of shield members 28, the two shield members on each shield assembly can move in and out without always being constrained to a parallel relationship with each other. Thus is is also possible, in a suitably constructed flexible belt carrier mechanism, for the shield assembly to keep the spaces between work holders filled, even in such mechanisms designed to follow arcuate paths to the left or right, as well as around a drum.

It is to be understood that the present invention is by no means limited to the particular construction herein disclosed and/or shown in the drawings, but also comprises any modifications or equivalents within the scope of the disclosure.

Having thus described my invention, I claim:

1. In an endless flexible belt carrier mechanism including an endless flexible belt and a plurality of work holders attached to and spaced along said belt, the improvement which comprises a shield assembly for insertion in the spaces between said work holders and adapted to be moved along with said belt, said shield assembly comprising a pair of movable shield members biased outwardly from said shield assembly into contact with said work holders on either side of said shield assembly, whereby said shield assembly maintains contact with said work holders when said flexible carrier mechanism follows a straight path or a curved path.

2. A flexible belt carrier mechanism as defined in claim 1 in which said shield assembly is driven directly.

3. A flexible belt carrier mechanism as defined in claim 1 and further including guide means for restraining the movement of said shield assembly to the path of said flexible belt.

4. A flexible belt carrier mechanism as defined in claim 3 in which said guide means comprises projections on said shield assembly, and guide channels to receive said projections disposed along said path of said flexible belt.

5. In a flexible belt carrier mechanism wherein an endless flexible belt moves a series of work holders spaced apart along said flexible belt, the provision of a shield assembly for filling the spaces between said work holders and enclosing said flexible belt carrier mechanism; said shield assembly comprising a shoe of generally rectangular shape having first and second parallel edges, side projections for guiding said shield assembly along said flexible belt carrier mechanism, pairs of guide pins disposed generally adjacent to the first and second edges; a pair of shield members mounted on said shoe, said shield members having guide slots into which said guide pins extend, whereby said shield members can move inwardly and outwardly of said first and second edges; biasing means disposed between said shield members to urge said shield members outwardly from said first and second edges; and a cover to enclose said shield assembly.

6. In an endless flexible belt carrier mechanism including an endless flexible belt and a plurality of work holders attached to and spaced along said belt, the improvement which comprises a shield assembly for insertion in the spaces between said work holders and adapted to be moved along with said belt, and guide means for restraining the movement of said shield assembly to the path of said flexible belt; said guide means comprising projections on said shield assembly, and guide channels to receive said projections disposed along the path of said flexible belt.

7. A flexible belt carrier mechanism as defined in claim 6 in which said shield assembly is driven directly.

* * * * *